(12) United States Patent
Kim et al.

(10) Patent No.: US 9,735,426 B2
(45) Date of Patent: Aug. 15, 2017

(54) CATHODE ACTIVE MATERIAL, CATHODE AND LITHIUM BATTERY INCLUDING THE SAME, AND METHOD OF PREPARING THE CATHODE ACTIVE MATERIAL

(71) Applicant: Samsung Electronics Co., Ltd., Suwon-si, Gyeonggi-do (KR)

(72) Inventors: Myunghoon Kim, Seoul (KR); Jaegu Yoon, Suwon-si (KR); Donghee Yeon, Seoul (KR); Jinhwan Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/561,323

(22) Filed: Dec. 5, 2014

(65) Prior Publication Data
US 2015/0162609 A1 Jun. 11, 2015

(30) Foreign Application Priority Data

Dec. 6, 2013 (KR) .................. 10-2013-0151712

(51) Int. Cl.
| | | |
|---|---|---|
| *H01M 4/505* | (2010.01) | |
| *H01M 4/525* | (2010.01) | |
| *C01D 15/02* | (2006.01) | |
| *C01G 45/12* | (2006.01) | |
| *C01G 53/00* | (2006.01) | |
| *H01M 10/052* | (2010.01) | |

(52) U.S. Cl.
CPC ........ *H01M 4/505* (2013.01); *C01G 45/1257* (2013.01); *C01G 53/50* (2013.01); *C01G 53/56* (2013.01); *C01P 2002/72* (2013.01); *C01P 2006/40* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 6,720,111 B2 | 4/2004 | Tabuchi et al. | |
| 7,468,223 B2 | 12/2008 | Thackeray et al. | |
| 2008/0206644 A1* | 8/2008 | Kanno et al. | |
| 2009/0104530 A1* | 4/2009 | Shizuka | H01M 4/505 429/223 |
| 2010/0112448 A1* | 5/2010 | Yu | H01M 4/131 429/224 |
| 2010/0248033 A1 | 9/2010 | Kumar et al. | |
| 2013/0017435 A1* | 1/2013 | Sato | H01M 4/505 429/158 |
| 2015/0014581 A1* | 1/2015 | Kawakami | H01M 4/505 252/182.1 |
| 2015/0014605 A1* | 1/2015 | Kawakami | H01M 4/505 252/519.12 |
| 2015/0079463 A1* | 3/2015 | Yamamoto | H01M 4/0447 429/188 |

FOREIGN PATENT DOCUMENTS

| | | | | |
|---|---|---|---|---|
| JP | 3940788 B2 | | 4/2007 | |
| JP | 4963059 B2 | | 4/2012 | |
| JP | 2012066944 | * | 4/2012 | |
| JP | WO 2013161445 A1 | * | 10/2013 | ............ H01M 4/505 |
| KR | 1020090019887 A | | 2/2009 | |
| KR | 1020100064632 A | | 6/2010 | |
| KR | 10-1369951 B1 | | 2/2014 | |

\* cited by examiner

*Primary Examiner* — Tanisha Diggs
(74) *Attorney, Agent, or Firm* — Cantor Colburn LLP (57) ABSTRACT

A cathode active material including a lithium transition metal oxide of Chemical Formula 1:

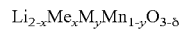

Chemical Formula 1 wherein $0 \le x \le 0.2$, $0 \le y \le 0.2$, $0 < x+y \le 0.4$, and $0 \le \delta < 1$, and Me and M are each independently one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element.

16 Claims, 4 Drawing Sheets

CATHODE ACTIVE MATERIAL, CATHODE AND LITHIUM BATTERY INCLUDING THE SAME, AND METHOD OF PREPARING THE CATHODE ACTIVE MATERIAL

RELATED APPLICATION

This application claims the benefit of priority to Korean Patent Application No. 10-2013-0151712, filed on Dec. 6, 2013, in the Korean Intellectual Property Office, and all the benefits accruing therefrom under 35 U.S.C. §119, the content of which is incorporated herein in its entirety by reference.

BACKGROUND

1. Field

The present disclosure relates to a cathode active material, a cathode, and a lithium battery including the same, and methods of preparing the cathode active material.

2. Description of the Related Art

Transition metal compounds, such as $LiNiO_2$, $LiCoO_2$, $LiMn_2O_4$, $LiFePO_4$, $LiNi_xCo_{1-x}O_2$ ($0 \leq x \leq 1$), $LiNi_{1-x-y}Co_xMn_yO_2$ ($0 \leq x \leq 0.5$, $0 \leq y \leq 0.5$), or oxides of the transition metal compounds and lithium are used as a cathode active material for a lithium battery. $LiCoO_2$ is relatively expensive, and since a substantial electrical capacity of $LiCoO_2$ is about 140 mAh/g, $LiCoO_2$ has limited electrical capacity. Also, since about 50% or more of the lithium in the $LiCoO_2$ is removed when a charge voltage is increased to about 4.2 V or more, in charged battery the $LiCoO_2$ may be $Li_{1-x}CoO_2$ ($x>0.5$). Oxides in the form of $Li_{1-x}CoO_2$ ($x>0.5$) are structurally unstable and the electrical capacities thereof rapidly decrease as charge and discharge cycles proceed.

Cathode active materials such as $LiNi_xCo_{1-x}O_2$ ($x=1, 2$) or $LiNi_{1-x-y}Co_xMn_yO_2$ ($0 \leq x \leq 0.5$, $0 \leq y \leq 0.5$), may have poor swelling suppression characteristics at a high temperature.

$Li_2MnO_3$ has a high theoretical electrical capacity of about 460 mAh/g and a high driving voltage. However, $Li_2MnO_3$ may have low ionic conductivity and electronic conductivity, and may have poor cycle characteristics and stability due to phase changes which occur during a charge and discharge process. Thus there remains a need for an improved cathode active material.

SUMMARY

Provided is a heterogeneous element-substituted cathode active material.

Provided is a cathode including the cathode active material.

Provided is a lithium battery including the cathode.

Provided is a method of preparing the cathode active material.

Additional aspects will be set forth in part in the description which follows and, in part, will be apparent from the description.

According to an aspect, a cathode active material includes a lithium transition metal oxide of Chemical Formula 1:

Chemical Formula 1 wherein $0 \leq x \leq 0.2$, $0 \leq y \leq 0.2$, $0 < x+y \leq 0.4$, and $0 \leq \delta < 1$, and wherein Me and M are each independently one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element.

According to another aspect, a cathode includes the cathode active material.

According to another aspect, a lithium battery includes the cathode.

According to another aspect, a method of preparing a cathode active material includes: providing a solution including a manganese precursor and a second precursor comprising one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element; precipitating the precursors to obtain a metal hydroxide; mixing the metal hydroxide; and heat treating the metal hydroxide and a lithium precursor to prepare the cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

"Group" means a group of the Periodic Table of the Elements according to the International Union of Pure and Applied Chemistry ("IUPAC") Group 1-18 group classification system.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

The "lanthanide elements" means the chemical elements with atomic numbers 57 to 71.

Hereinafter, a cathode active material, a cathode including the cathode active material, a lithium battery including the cathode, and a method of preparing the cathode active material are disclosed in more detail.

A cathode active material according to an embodiment comprises a lithium transition metal oxide of Chemical Formula 1:

$$Li_{2-x}Me_xM_yMn_{1-y}O_{3-\delta}$$   Chemical Formula 1 wherein 0≤x≤0.2, 0≤y≤0.2, 0<x+y≤0.4, and 0≤δ<1, and wherein Me and M are each independently one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element.

With respect to the lithium transition metal oxide, and while not wanting to be bound by theory, ionic conductivity and/or electronic conductivity of $Li_2MnO_3$ are understood to be improved by substituting at least a portion of one or more of manganese and lithium in a $Li_2MnO_3$ compound with another metal. That is, the lithium transition metal oxide may be electrically activated by substituting the lithium transition metal oxide with a heterogeneous element, i.e., with a metal other than Li and Mn. While not wanting to be bound by theory, it is understood that the substitution results in improved initial capacity, improved initial efficiency, and improved cycle characteristics of a lithium battery including the lithium transition metal oxide.

For example, the substituting metal may be selected in consideration of a formation energy during the synthesis of the lithium transition metal oxide, phase stability of a lithium/manganese system in the lithium transition metal oxide, and tendencies of lithium-ion conductivity and electronic conductivity of the lithium transition metal oxide. The formation energy may provide information about the feasibility of the synthesis of the lithium transition metal oxide including the substituting metal, the phase stability of lithium and manganese may provide information about the occurrence of a phase transition during the charge and discharge process, and the lithium-ion conductivity and electronic conductivity may provide information about the cycle characteristics of the lithium battery including the lithium transition metal oxide.

For example, in Chemical Formula 1, x and y may be $0 \leq x < 0.2$, $0 \leq y < 0.2$, and $0 < x+y \leq 0.4$. For example, in Chemical Formula 1, x and y may be $0 \leq x \leq 0.15$, $0 \leq y \leq 0.15$, and $0 < x+y \leq 0.3$.

In an embodiment provided is a lithium transition metal oxide of Chemical Formula 1 wherein x and y may be $0 \leq x < 0.2$, $0 \leq y < 0.2$, $0 < x+y < 0.3$, and $0 \leq \delta < 1$, and Me and M may each independently be one or more metals selected from Ni, Cu, Ti, and Sn.

For example, the lithium transition metal oxide in the cathode active material may be expressed by Chemical Formula 2.

$$Li_{2-x}Me_xMnO_{3-\delta} \quad \text{Chemical Formula 2}$$

wherein $0 < x \leq 0.2$ and $0 \leq \delta < 1$, and Me is one or more metals selected from Mg, Ca, Sr, Ti, Zr, Hf, V, Nb, Ta, W, Tc, Re, Ru, Os, Co, Rh, Ir, Ni, Pd, Pt, Cu, Al, Ga, In, Si, Ge, Sn, and a rare earth element.

For example, in Chemical Formula 2, x may be $0 < x < 0.2$. For example, in Chemical Formula 2, x may be $0 < x \leq 0.15$. For example, in Chemical Formula 2, x may be $0.05 < x \leq 0.15$.

For example, in Chemical Formula 2, Me may be one or more metals selected from Ni, Cu, Ti, and Sn. For example, in Chemical Formula 2, Me may be Ni, Cu, or Ti.

For example, the lithium transition metal oxide in the cathode active material may be expressed by Chemical Formula 3.

$$Li_2M_yMn_{1-y}O_{3-\delta} \quad \text{Chemical Formula 3}$$

In Chemical Formula 3, $0 < y \leq 0.2$ and $0 \leq \delta < 1$, and M is one or more metals selected from Mg, Ca, Sr, Ti, Zr, Hf, V, Nb, Ta, W, Tc, Re, Ru, Os, Co, Rh, Ir, Ni, Pd, Pt, Cu, Al, Ga, In, Si, Ge, Sn, and a rare earth element.

For example, in Chemical Formula 3, y may be $0 < y < 0.2$. For example, in Chemical Formula 3, y may be $0 < y \leq 0.15$. For example, in Chemical Formula 3, y may be $0.05 < y \leq 0.15$.

For example, in Chemical Formula 3, M may be one or more metals selected from Ni, Cu, Ti, and Sn. For example, in Chemical Formula 3, M may be Cu, Ti, or Sn.

For example, lithium transition metal oxide in the cathode active material may be expressed by Chemical Formulas 4 and 5.

$$Li_{2-x}Ni_xMnO_{3-\delta} \quad \text{Chemical Formula 4}$$

wherein $0 < x \leq 0.2$ and $0 \delta < 1$, and $$Li_2Sn_yMn_{1-y}O_{3-\delta} \quad \text{Chemical Formula 5}$$

wherein $0 < y \leq 0.2$ and $1 \leq \delta 1$.

Although at least a portion of lithium and manganese in the cathode active material may be substituted with another metal, the lithium transition metal oxide may still have a layered structure. In particular, the lithium transition metal oxide may consist essentially of, or consist of, a phase having a layered structure. In an embodiment, the layered structure is present in an amount of about 90 weight percent (wt %) to 100 wt %, or about 95 wt % to about 99.99 wt %, or about 96 wt % to about 99.999 wt %, based on a total weight of the lithium transition metal oxide. That is, the lithium transition metal oxide may comprise only a phase having a layered structure, and may be free of, e.g., not substantially comprise, or not comprise, a phase including a spinel structure or a spinel-like structure. In an embodiment a content of a phase including a spinel structure in the lithium transition metal oxide may be contained in an amount less than about 1 weight percent (wt %), or less than about 1 wt %, or less than about 0.1 wt %, or may be 0 to about 1 wt %, or 0 to about 0.1 wt %, or 0 to about 0.01 wt %, based on a total weight of the lithium transition metal oxide. While not wanting to be bound by theory, it is understood that since the lithium transition metal oxide is free of the phase including a spinel structure, the lithium transition metal oxide may provide improved cycle characteristics. That is, the lithium transition metal oxide may be structurally stabilized by substituting at least a portion of lithium and manganese in the lithium transition metal oxide with another metal. However, in a case where an amount of the substituting other metal is excessively high, a crystal structure of the lithium transition metal oxide may be changed, and thus, its structural stability may be reduced. Therefore, the amount of the substituting other metal may be selected to be a range in which the crystal structure of the lithium transition metal oxide is not undesirably changed.

For example, the crystal structure of the lithium transition metal oxide may have monoclinic symmetry and may belong to space group C2/m. Therefore, the lithium transition metal oxide may be structurally different from other lithium transition metal oxides, such as those having trigonal symmetry, specifically those which belong to space group R3m. In an embodiment, a phase having trigonal symmetry is not present.

The lithium transition metal oxide in the cathode active material may exhibit a peak at a Bragg angle of about 37.0±0.2° two-theta (2θ) for Cu—Kα X-ray radiation having a wavelength of about 1.541 angstroms (A). When a new phase is formed in the lithium transition metal oxide, the position of the peak at 37.0±0.2° 2θ may move to exhibit a peak for the new phase at an angle of less than about 37.0±0.2° 2θ, and the cycle characteristics of the lithium battery are understood to degrade due to the formation of the new phase. In an embodiment, the intensity of the peak at a Bragg angle of about 37.0±0.2° 2θ is at least 10 times, 100 times, or 1000 times greater than an intensity of a peak at a Bragg angle of about 36.0° 2θ to about 36.8° 2θ, if present.

Also, a new phase due to a phase transition may not be formed at a low voltage of about 2.5 volts (V) or less with respect to lithium metal during a discharge process of the lithium battery including the lithium transition metal oxide. That is, since the lithium transition metal oxide is electrochemically stable during the charge and discharge process, the lithium transition metal oxide does not form a new irreversible phase, and thus, the lithium transition metal oxide may inhibit the reduction of discharge capacity from charge and discharge processes.

Furthermore, the lithium battery including the lithium transition metal oxide may provide a high voltage of about 4.5 V or more with respect to lithium metal and a discharge capacity of about 200 milliampere-hours per gram (mAh/g) or more. That is, the lithium transition metal oxide may simultaneously provide high voltage and increased discharge capacity.

A cathode according to another embodiment may include the cathode active material. The cathode, for example, may be prepared by forming a cathode active material composition including the cathode active material and a binder into a predetermined shape or may be prepared by a method of coating a current collector, such as a copper foil and an aluminum foil, with the cathode active material composition.

Specifically, a cathode active material composition is prepared in which the cathode active material composition may comprise a mixture of the cathode active material, a conductive agent, a binder, and a solvent. The cathode active material composition may be directly coated on a metal current collector to prepare a cathode plate. Alternatively, the cathode active material composition may be cast on a separate support and a cathode plate may then be prepared by laminating films detached from the support on a metal current collector. The cathode is not limited to the above-described form and may have other forms.

Also, in addition to the above-described cathode active material, the cathode may further include an additional cathode active material that is different from the above-described cathode active material in terms of composition and physical properties.

The additional cathode active material may be a lithium-containing metal oxide, and any suitable cathode active material used in the art may be used without limitation. For example, a composite oxide of one or more metal selected from cobalt, manganese, and nickel, and lithium may be used, and as particular examples thereof, a compound expressed as one of the following chemical formulas may be used: $LiA_{1-b}M'_bM''_2$ (where $0.90 \leq a \leq 1$, $0 \leq b \leq 0.5$); $Li_aE_{1-b}M'_bO_{2-c}R_c$ (where $0.90 \leq a \leq 1$, $0 \leq b \leq 0.5$, $0 \leq c \leq 0.05$); $LiE_{2-b}M'_bO_{4-c}R_c$ (where $0 \leq b \leq 0.5$, $0 \leq c \leq 0.05$); $Li_aNi_{1-b-c}Co_bM'_cR_\alpha$ (where $0.90 \leq a \leq 1$, $0 \leq b \leq 0.5$, $0 \leq c \leq 0.05$, $0 < \alpha \leq 2$); $Li_aNi_{1-b-c}Co_bM'_cO_{2-\alpha}X_\alpha$ (where $0.90 \leq a \leq 1$, $0 \leq b \leq 0.5$, $0 \leq c \leq 0.05$, $0 < \alpha \leq 2$); $Li_aNi_{1-b-c}Co_bM'_cO_{2-\alpha}X_2$ (where $0.90 \leq a \leq 1$, $0 \leq b \leq 0.5$, $0 \leq c \leq 0.05$, $0 < \alpha \leq 2$); $Li_aNi_{1-b-c}Mn_bM'_cR_\alpha$ (where $0.90 \leq a \leq 1$, $0 \leq b \leq 0.5$, $0 \leq c \leq 0.05$, $0 < \alpha \leq 2$); $Li_aNi_{1-b-c}Mn_bM'_cO_{2-\alpha}X\alpha$ (where $0.90 \leq a \leq 1$, $0 \leq b \leq 0.5$, $0 \leq c \leq 0.05$, $0 < \alpha < 2$); $Li_aNi_{1-b-c}Mn_bM'_cO_{2-\alpha}X_2$ (where $0.90 \leq a \leq 1$, $0 \leq b \leq 0.5$, $0 \leq c \leq 0.05$, $0 < \alpha < 2$); $Li_aNi_bE_cG_dO_2$ (where $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1$, $0.001 \leq b \leq 0.1$); $Li_aCoG_bO_2$ (where $0.90 \leq a \leq 1$, $0.001 \leq b \leq 0.1$); $Li_aMnG_bO_2$ (where $0.90 \leq a \leq 1$, $0.001 \leq b \leq 0.1$); $Li_aMnG_bO_4$ (where $0.90 \leq a \leq 1$, $0.001 \leq b \leq 0.1$); $QO_2$; $QS_2$; $LiQS_2$; $V_2O_5$; $LiV_2O_5$; $LiM''O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is one or more selected from Ni, Co, and manganese (Mn); M' is one or more selected from Al, Ni, Co, Mn, chromium (Cr), iron (Fe), Mg, Sr, V, and a rare earth element; R is one or more selected from oxygen (O), fluorine (F), sulfur (S), and phosphorus (P); E is one or more selected from Co, and Mn; X is one or more selected from F, S, and P; G is one or more selected from Al, Cr, Mn, Fe, Mg, lanthanum (La), cerium (Ce), Sr, and V; Q is one or more selected from Ti, molybdenum (Mo), and Mn; M'' is one or more selected from Cr, V, Fe, scandium (Sc), and yttrium (Y); J is one or more selected from V, Cr, Mn, Co, Ni, and Cu.

Examples of the additional cathode active material include $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \leq x \leq 0.5$, $0 \leq y \leq 0.5$), and $FePO_4$.

A coating layer may be provided on the cathode active material and/or the additional cathode active material, and a composition may be prepared by combining the cathode active material and/or the additional cathode active material and a compound for the coating layer. The coating layer may include a compound of a coating element such as an oxide, hydroxide, oxyhydroxide, oxycarbonate, or hydroxycarbonate of the coating element. The compound constituting the coating layer may be amorphous or crystalline. Examples of the coating element included in the coating layer may be one or more selected from Mg, Al, Co, potassium (K), sodium (Na), Ca, Si, Ti, V, Sn, Ge, Ga, boron (B), arsenic (As), and Zr. Any suitable coating method may be used for a process of forming a coating layer as long as coating is performed by a method (e.g., spray coating, or dipping) that does not adversely affect the physical properties of the cathode active material due to using such coating elements on the cathode active material. Further detailed description related to the coating method may be determined by one of skill in the art without undue experimentation, and thus is not provided here for clarity.

Carbon black and fine graphite particles may be used as the conductive agent. However, the conductive agent is not limited thereto and any suitable conductive agent may be used.

A vinylidene fluoride/hexafluoropropylene copolymer, polyvinylidene fluoride (PVDF), polyacrylonitrile, poly(methyl methacrylate), polytetrafluoroethylene, and mixtures thereof, or a styrene butadiene rubber-based polymer may be used as the binder. However, the binder is not limited thereto and any suitable binder may be used.

Examples of the solvent may be N-methylpyrrolidone, acetone, and water. However, the solvent is not limited thereto and any suitable solvent may be used.

The content of the cathode active material, conductive agent, binder, and solvent are amounts suitable for use in a lithium battery. One or more of the conductive agent, binder, and the solvent may be omitted if desired.

A lithium battery according to another embodiment may include the cathode including the composite cathode active material. The lithium battery may be prepared according to the following method.

First, a cathode is prepared according to the above-described method of preparing a cathode.

Next, an anode may be prepared as follows: The anode may be prepared in the same manner as the cathode except that an anode active material is used instead of the composite cathode active material. Also, a conductive agent, a binder, and a solvent that are used in an anode active material composition may be the same as those of the cathode.

For example, the anode active material composition may be prepared by combining an anode active material, a conductive agent, a binder and a solvent, and the anode active material composition is directly coated on a copper current collector to prepare an anode plate. Alternatively, the anode active material composition may be cast on a separate support and an anode plate may then be prepared by laminating an anode active material film which is detached from the support on a copper current collector.

Also, with respect to the anode active material, any suitable anode active material may be used. For example, the anode active material may include one or more selected from lithium metal, a metal alloyable with lithium, a transition metal oxide, a non-transition metal oxide, and a carbon-based material.

Examples of the metal alloyable with lithium may be one or more selected from Si, Sn, Al, Ge, lead (Pb), bismuth (Bi), antimony (Sb), an Si-L alloy (where L is one or more selected from an alkali metal, alkaline-earth metal, a Group 13 element, a Group 14 element, a transition metal, and a rare earth element, and is not Si), an Sn-L' alloy (where L' is one or more selected from alkali metal, alkaline-earth metal, a Group 13 element, a Group 14 element, a transition metal, and a rare earth element, and is not Sn), etc. Examples of the element L' may be one or more selected from Mg, Ca, Sr, barium (Ba), radium (Ra), Sc, Y, Ti, Zr, Hf, rutherfordium (Rf), V, Nb, Ta, dubnium (Db), Cr, Mo, W, seaborgium (Sg), Tc, Re, bohrium (Bh), Fe, Pb, Ru, Os, hassium (Hs), Rh, Ir, Pd, Pt, Cu, silver (Ag), gold (Au), zinc (Zn), cadmium (Cd), B, Al, Ga, Sn, In, Ge, P, As, Sb, Bi, S, selenium (Se), tellurium (Te), and polonium (Po).

For example, the transition metal oxide may be lithium titanate, vanadium oxide, or lithium vanadium oxide.

For example, the non-transition metal may be $SnO_2$, or $SiO_x$ ($0<x<2$).

The carbon-based material may comprise one or more selected from a crystalline carbon, and an amorphous carbon. The crystalline carbon may be graphite such as spherical, plate, flake, spherical, or fibrous natural graphite or artificial graphite, and the amorphous carbon may be comprise one or more selected from soft carbon (low-temperature fired carbon), hard carbon, mesophase pitch carbide, and fired coke.

The content of the anode active material, conductive agent, binder, and solvent are amounts suitable for use in a lithium battery.

Next, a separator, which will be inserted between the cathode and the anode, is prepared. Any separator that is suitable for a lithium battery may be used as the separator. A separator having high moisture-retention ability for an electrolyte as well as low resistance to the transfer of electrolyte ions may be used. Examples of the separator may be one or more selected from glass fibers, polyester, Teflon, polyethylene, polypropylene, and polytetrafluoroethylene (PTFE). The separator may be a nonwoven or woven fabric. For example, a windable separator, such as polyethylene or polypropylene, may be used in a lithium-ion battery, and a separator having high moisture-retention for an organic electrolyte may be used in a lithium-ion polymer battery. For example, the separator may be prepared according to the following method.

A separator composition is prepared by mixing a polymer resin, a filler, and a solvent. The separator composition may be directly coated on an upper portion of an electrode and dried to prepare a separator. Also, the separator composition may be cast and dried on a support, and a separator may then be prepared by laminating separator films detached from the support on an upper portion of an electrode.

A polymer resin used in the preparation of the separator is not particularly limited and any suitable material for a binder for an electrode plate may be used. Examples of the polymer resin may be one or more selected from vinyl idene fluoride/hexafluoropropylene copolymer, PVDF, polyacrylonitrile, and poly(methyl methacrylate).

Next, an electrolyte may be prepared.

For example, the electrolyte may be an organic electrolyte. Also, the electrolyte may be a solid. For example, the electrolyte may comprise boron oxide, or lithium oxynitride. However, the electrolyte is not limited thereto and any suitable electrolyte may be used as long as it is used in the art. The solid electrolyte may be disposed on the anode by a method such as sputtering.

For example, an organic electrolyte may be prepared. The organic electrolyte may be prepared by dissolving a lithium salt in an organic solvent.

Any suitable organic solvent may be used. Examples of the organic solvent may be one or more selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, and dimethylether.

Any suitable lithium salt may be used. Examples of the lithium salt may be one or more selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, and LiI.

Figure 7:
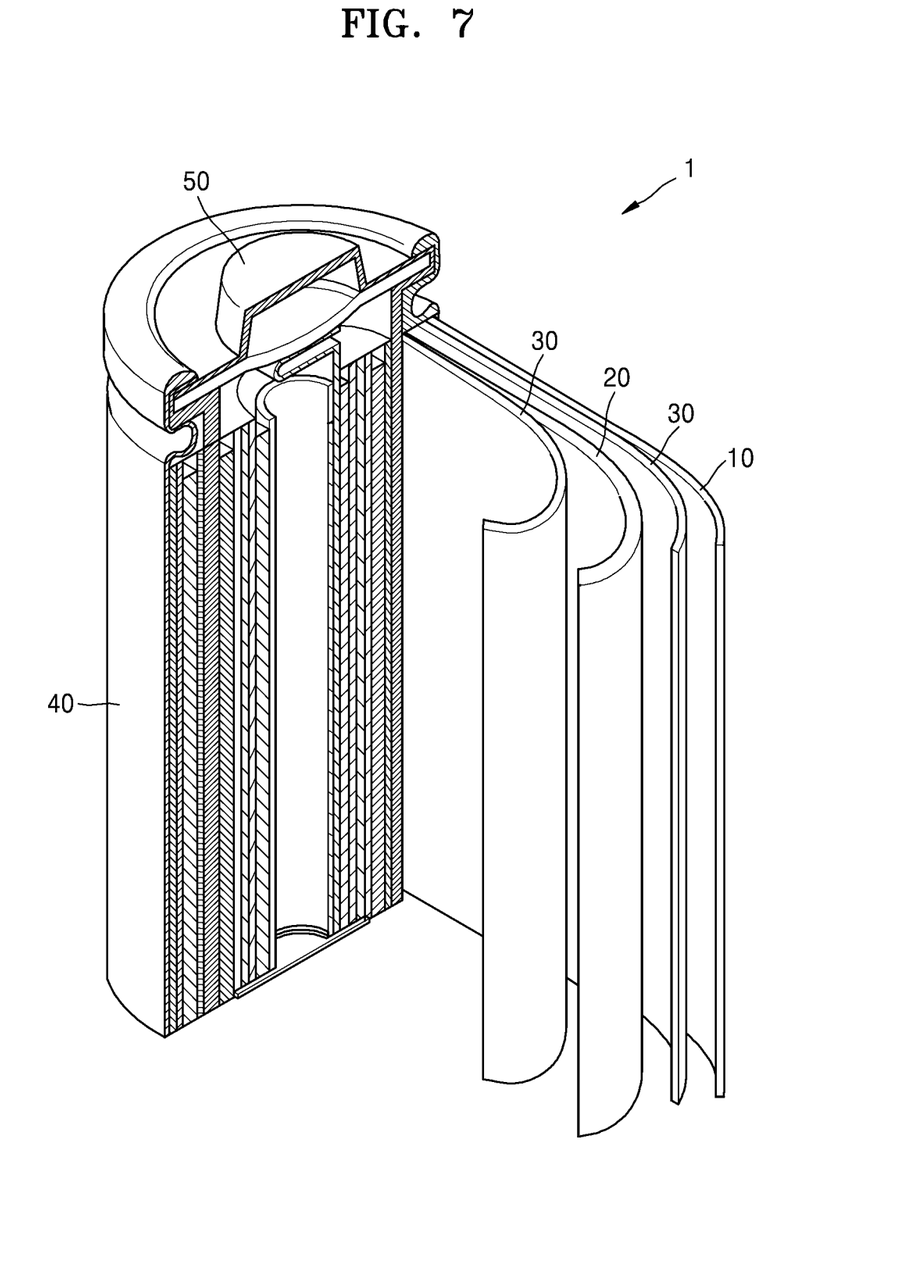
FIG. 7 is a schematic diagram of a lithium battery according to an embodiment.

As shown in FIG. 7, a lithium battery 1 includes a cathode 10, an anode 20, and a separator 30. The cathode 10, anode 20, and separator 30 are wound and folded to be contained in a battery case 40. Subsequently, an organic electrolyte solution is injected into the battery case 40 and the lithium battery 1 is completed by being sealed with a cap assembly 50. The battery case 40 may be a cylindrical, rectangular, or thin-film type. For example, the lithium battery 1 may be a large thin-film type battery. The lithium battery 1 may be a lithium-ion battery.

A separator is disposed between the cathode and the anode such that a battery structure may be formed. The battery structure may be stacked in a bi-cell structure, and then impregnated in an organic electrolyte solution. A lithium-ion polymer battery is completed when a product thus obtained is contained in a pouch and sealed.

Also, battery structures may be stacked to form a battery pack, and the battery pack may be used in a device demanding high capacity and high power. For example, the battery pack may be used in a notebook, smartphone, or electric vehicle (EV).

Furthermore, because the lithium battery has excellent high-rate and life characteristics, it may be used in an EV. For example, the lithium battery may be used in a hybrid vehicle such as a plug-in hybrid electric vehicle (PHEV). Also, the lithium battery may be used for grid storage. For example, the lithium battery may be used in electric bikes and power tools.

According to another embodiment, a method of preparing a cathode active material may include providing a solution comprising a manganese precursor and a second precursor comprising one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element; precipitating the precursors to obtain a metal hydroxide; mixing the metal hydroxides; and heat treating the metal hydroxide and a lithium precursor to prepare the cathode active material. An additional precursor comprising one or more metals selected from magnesium (Mg), calcium (Ca), strontium (Sr), titanium (Ti), zirconium (Zr), hafnium (Hf), vanadium (V), niobium (Nb), tantalum (Ta), tungsten (W), technetium (Tc), rhenium (Re), ruthenium (Ru), osmium (Os), cobalt (Co), rhodium (Rh), iridium (Ir), nickel (Ni), palladium (Pd), platinum (Pt), copper (Cu), aluminum (Al), gallium (Ga), indium (In), silicon (Si), germanium (Ge), tin (Sn), and a rare earth element, may be used.

The solution may be provided by preparing the solution, and the solution may comprise two or more transition metal precursors including a manganese precursor and a second precursor comprising a metal other than manganese.

Examples of the manganese precursor include manganese sulfate and manganese acetate. Examples of the second precursor include nickel sulfate, nickel acetate, copper sulfate, tin chloride, titanium isopropoxide, cobalt acetate, and ruthenium acetylacetonate. With respect to a molar ratio of manganese to a metal of the second precursor, greater than 0 to about 0.2 mole of the metal of the second precursor may be included with respect to about 1 mole of manganese.

In the precipitating of the metal precursors to obtain transition metal hydroxides, the precipitation may be performed using a reducing agent. The reducing agent may be sodium hydroxide. The precipitated transition metal hydroxide may be filtered and washed to obtain a dried product.

The lithium precursor used in the mixing and heat treating of the transition metal hydroxides and the lithium precursor may be lithium carbonate.

The heat treating of the precipitate may be performed at a temperature range of about 500° C. to about 950° C., or about 550° C. to about 900° C., for about 6 hours to about 12 hours, or about 7 hours to about 11 hours. However, the heat treating of the precipitate may be appropriately selected as desired. The heat treated lithium metal oxide may be dry cooled in a furnace. The heat treatment may be performed in an air atmosphere. However, the heat treatment is not limited thereto and the heat treatment may be performed in any suitable atmosphere as long as the atmosphere is an oxidizing atmosphere.

The present disclosure is described in more detail according to examples and comparative examples below. However, the examples are only exemplary, and the scope of the present disclosure shall not be limited thereto.

EXAMPLES (Preparation of Cathode Active Material)

Example 1: Preparation of $Li_{1.9}Ni_{0.1}MnO_3$ (Heat Treatment at 600° C.)

A first aqueous solution including 0.1 molar (M) manganese sulfate and 0.01 M nickel sulfate was prepared to obtain a molar ratio of manganese to nickel of about 1:0.1, and a second solution including 0.44 M sodium hydroxide was prepared.

The first solution and the second solution were mixed to co-precipitate manganese and nickel, and thus, a transition metal hydroxide was obtained. The transition metal hydroxide was washed and filtered to obtain dry powder.

The dry powder was mixed with lithium carbonate.

The mixture was put in a furnace and heat treated at a temperature of about 600° C. for 12 hours while supplying dry air to prepare a cathode active material. The cathode active material was cooled in the furnace. The prepared cathode active material was $Li_{1.9}Ni_{0.1}MnO_3$.

Example 2: Preparation of $Li_{1.9}Ni_{0.1}MnO_3$ (Heat Treatment at 900° C.)

A cathode active material was prepared in the same manner as in Example 1 except that the heat treatment temperature was changed to about 900° C.

Example 3: Preparation of $Li_{1.9}Cu_{0.1}MnO_3$ (Heat Treatment at 900° C.)

A first aqueous solution including 0.1 M manganese sulfate and 0.01 M copper acetate was prepared to obtain a molar ratio of manganese to copper to be about 1:0.1, and a second solution including 0.44 M sodium hydroxide was prepared.

The first solution and the second solution were mixed to co-precipitate manganese and copper, and thus, a transition metal hydroxide was obtained. The transition metal hydroxide was washed and filtered to obtain dry powder.

The dry powder was mixed with lithium carbonate.

The mixture was put in a furnace and heat treated at a temperature of about 900° C. for 12 hours while supplying dry air to prepare a cathode active material. The cathode active material was cooled in the furnace. The prepared cathode active material was $Li_{1.9}Cu_{0.1}MnO_3$.

Example 4: Preparation of $Li_2Sn_{0.05}Mn_{0.95}O_3$ (Heat Treatment at 900° C.)

A first aqueous solution including 0.095 M manganese sulfate and 0.005 M tin acetate was prepared to obtain a molar ratio of manganese to tin to be about 0.95:0.05, and a second solution including 0.44 M sodium hydroxide was prepared.

The first solution and the second solution were mixed to co-precipitate manganese and tin, and thus, a transition metal hydroxide was obtained. The transition metal hydroxide was washed and filtered to obtain a dry powder.

The dry powder was mixed with lithium carbonate.

The mixture was put in a furnace and heat treated at a temperature of about 900° C. for 12 hours while supplying dry air to prepare a cathode active material. The cathode active material was cooled in the furnace. The prepared cathode active material was $Li_2Sn_{0.05}Mn_{0.95}O_3$.

Comparative Example 1: Preparation of $Li_2MnO_3$ (Heat Treatment at 600° C.)

A first aqueous solution including 0.1 M manganese sulfate was prepared, and a second solution including 0.44 M sodium hydroxide was prepared.

The first solution and the second solution were mixed to precipitate manganese, and thus, a manganese hydroxide was obtained. The manganese hydroxide was washed and filtered to obtain dry powder.

The dry powder was mixed with lithium carbonate.

The mixture was put in a furnace and heat treated at a temperature of about 600° C. for 12 hours while supplying dry air to prepare a cathode active material. The cathode active material was cooled in the furnace. The prepared cathode active material was $Li_2MnO_3$.

Comparative Example 2: Preparation of $Li_2MnO_3$ (Heat Treatment at 900° C.)

A cathode active material was prepared in the same manner as in Comparative Example 1 except that the heat treatment temperature was changed to about 900° C.

Comparative Example 3: Preparation of $LiNi_{0.4}Co_{0.2}Mn_{0.4}O_2$ (Heat Treatment at 900° C.)

A first aqueous solution including 0.1 M manganese sulfate, 0.1 M nickel sulfate, and 0.05 M cobalt sulfate was prepared, and a second solution including 0.44 M sodium hydroxide was prepared.

The first solution and the second solution were mixed to co-precipitate nickel, cobalt, and manganese, and thus, a transition metal hydroxide was obtained. The transition metal hydroxide was washed and filtered to obtain dry powder.

The dry powder was mixed with lithium carbonate.

The mixture was put in a furnace and heat treated at a temperature of about 900° C. for 12 hours while supplying dry air to prepare a cathode active material. The cathode active material was cooled in the furnace. The prepared cathode active material was $LiNi_{0.4}Co_{0.2}Mn_{0.4}O_2$.

Comparative Example 4: Preparation of $Li_{1.75}Ni_{0.25}MnO_3$ (Heat Treatment at 900° C.)

A cathode active material was prepared in the same manner as in Example 1 except that a first aqueous solution including 0.1 M manganese sulfate and 0.025 M nickel sulfate was used to obtain a molar ratio of manganese to nickel to be about 1:0.25 and the heat treatment temperature was changed to about 900° C.

The cathode active material thus obtained was $Li_{1.75}Ni_{0.25}MnO_3$.

(Preparation of Cathode and Lithium Battery)

Example 5

The cathode active material powder synthesized in Example 1 and a carbon conductive agent (Denka Black) were uniformly mixed at a weight ratio of about 82:10, and a slurry was then prepared to obtain a weight ratio of active material:carbon conductive agent:binder of about 82:10:8 by adding a polyvinylidene fluoride (PVDF) binder solution.

About 15 μm thick aluminum foil was coated with the cathode active material slurry and then dried to prepare a cathode plate. A coin cell (CR2032 type) having a diameter of about 12 millimeters (mm) was prepared by further performing vacuum drying.

Metallic lithium was used as a counter electrode during the preparation of the coin cell, a PTFE separator was used as a separator, and an electrolyte used was prepared by dissolving about 1.3 M $LiPF_6$ in a solvent mixture of ethylene carbonate (EC):diethyl carbonate (DEC):ethylmethyl carbonate (EMC) (a volume ratio of about 3:5:2).

Examples 6 to 8

Lithium batteries were prepared in the same manner as in Example 5 except that the cathode active materials synthesized in Examples 2 to 4 were respectively used.

Comparative Example 5

A lithium battery was prepared in the same manner as in Example 5 except that the cathode active material synthesized in Comparative Example 1 was used.

Comparative Examples 6 to 8

Lithium batteries were prepared in the same manner as in Comparative Example 5 except that the cathode active materials synthesized in Comparative Examples 2 to 4 were respectively used.

Evaluation Example 1: X-Ray Diffraction (XRD) Analysis

Figure 1:
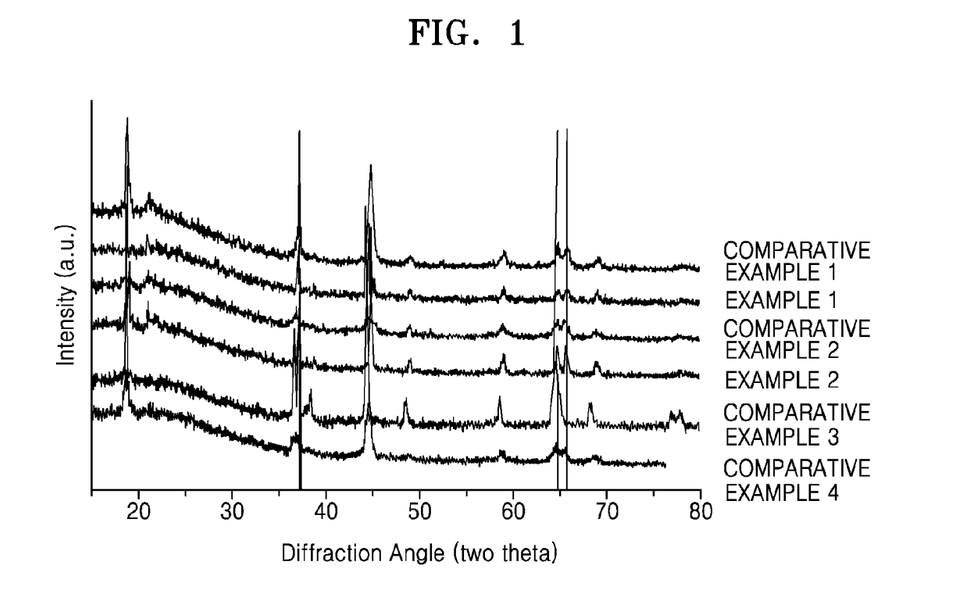
FIG. 1 is graph of intensity (arbitrary units, a.u.) versus diffraction angle (two-theta, $2\theta$) showing XRD spectra of cathode active materials prepared in Examples 1 and 2 and Comparative Examples 1 to 4.

XRD analyses were performed on the cathode active materials prepared in Examples 1 and 2 and Comparative Examples 1 to 4, and the results thereof are presented in FIG. 1.

As illustrated in FIG. 1, Examples 1 and 2 and Comparative Examples 1 and 2 exhibited similar XRD spectrums. All of the cathode active materials of Examples 1 and 2 and Comparative Examples 1 and 2 had crystal structures which belonged to space group C2/m.

In contrast, Comparative Example 3 had a crystal structure which belonged to space group R3m.

The cathode active materials of Examples 1 and 2 respectively exhibited peaks at a Bragg angle of about 37.0±0.2° two-theta (2θ).

In contrast, a peak of the cathode active material of Comparative Example 4 was shifted toward a lower diffraction angle and appeared at an angle of less than about 37.0±0.2°. Also, crystallinity of the cathode active material of Comparative Example 4 was decreased as the amount of Ni was increased, and the peaks thereof were shifted close to peaks of an R3m phase.

Evaluation Example 2: Inductively Coupled Plasma (ICP) Analysis

ICP analyses were respectively performed on the cathode active materials prepared in Examples 1 to 3 and Comparative Example 1, and the results thereof are presented in Table 1.

TABLE 1

| | Li [% wt/wt] | Mn [% wt/wt] | Ni [% wt/wt] | Li/(Mn + Ni) [% wt/wt] |
|---|---|---|---|---|
| Example 1 | 1.9268 | 1 | 0.1027 | 1.7473 |
| Comparative Example 1 | 1.9831 | 1 | — | 1.9831 |

As illustrated in Table 1, the composition of the cathode active material of Example 1 was $Li_{1.9}Ni_{0.1}MnO_3$, and the composition of the cathode active material of Comparative Example 1 was $Li_2MnO_3$.

Evaluation Example 3: Charge and Discharge Analysis

Figure 2:
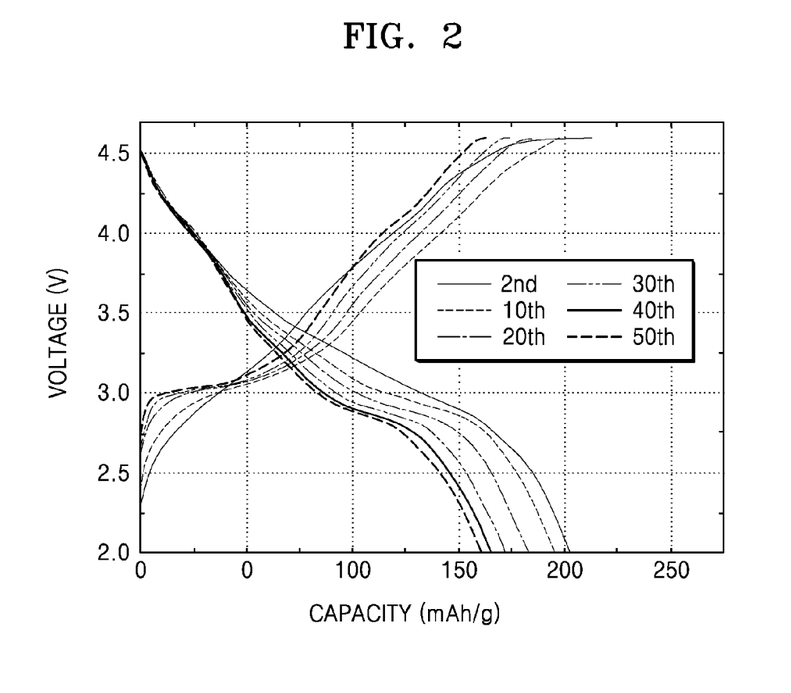
FIG. 2 is a graph of voltage (Volts versus lithium, V) versus capacity (milliampere-hours per gram) showing charge and discharge profiles of a lithium battery prepared in Example 5.
Figure 3:
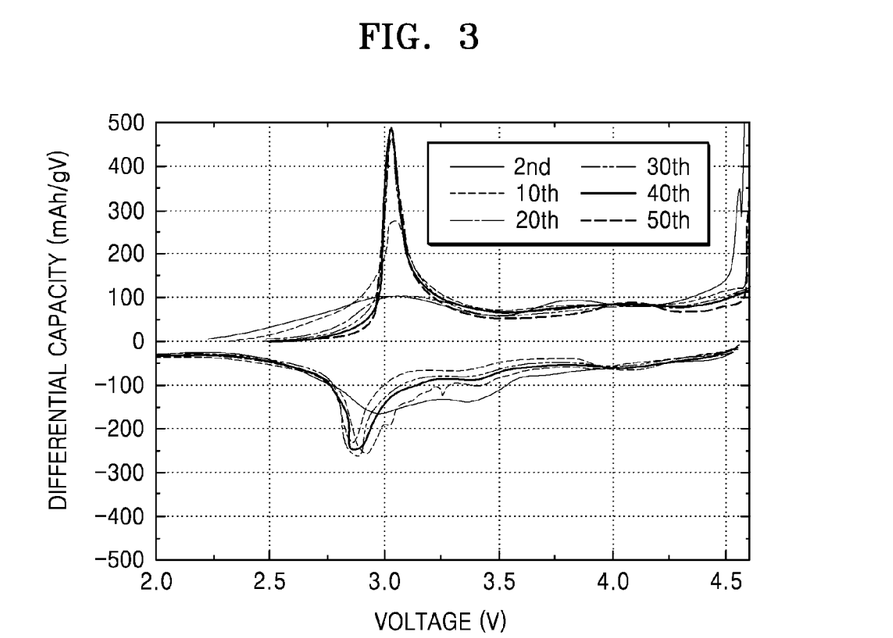
FIG. 3 is a graph of differential capacity (dQ/dV) versus voltage (volts versus lithium, V) of the lithium battery prepared in Example 5.
Figure 4:
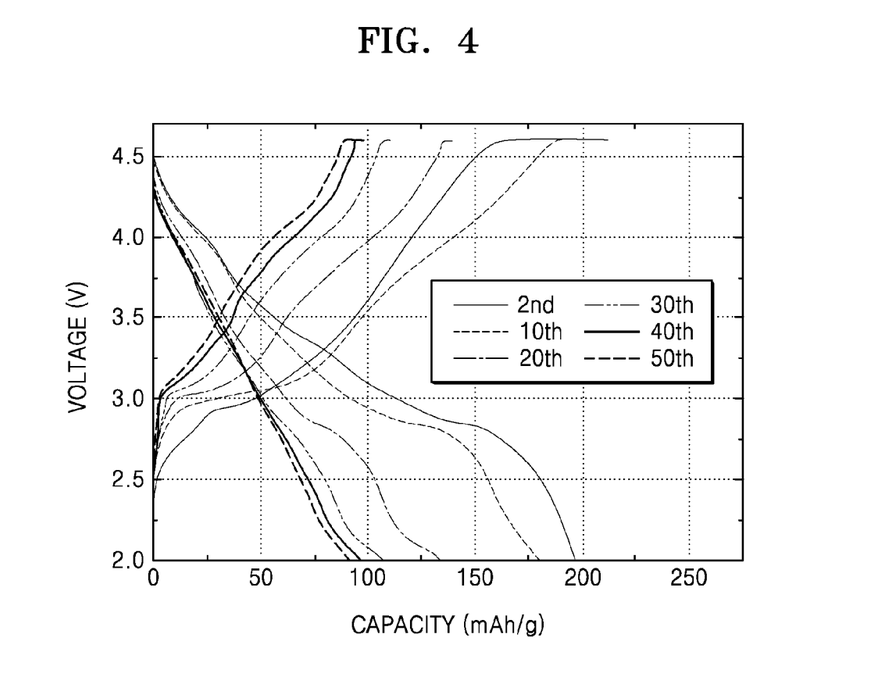
FIG. 4 is a graph of voltage (V) versus capacity (mAh/g) showing charge and discharge profiles of a lithium battery prepared in Comparative Example 5.
Figure 5:
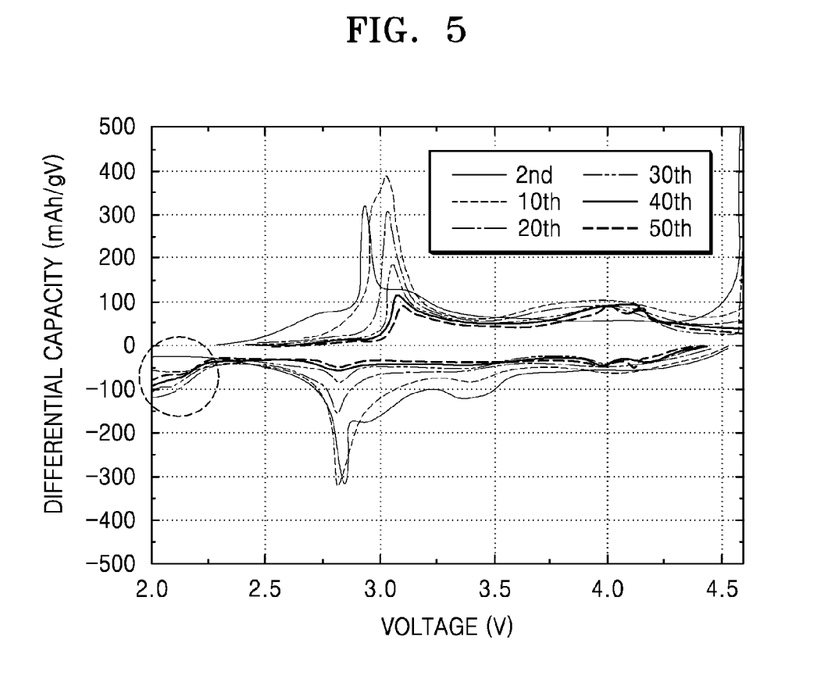
FIG. 5 is a graph of differential capacity versus voltage for the lithium battery prepared in Comparative Example 5.

The coin cells prepared in Examples 5 to 8 and Comparative Examples 5 to 8 were charged and discharged 50 times at a constant current of about 20 milliamperes (mA) in a voltage range of about 2.0 V to about 4.6 V with respect to lithium metal at about 25° C. Charge and discharge profiles of the lithium batteries of Example 5 and Comparative Example 5 are illustrated in FIGS. 2 and 4, respectively. FIGS. 3 and 5 illustrate the charge and discharge profiles of the lithium batteries of Example 5 and Comparative Example 5, respectively, as differential capacity (dQ/dV) vs. voltage graphs. Some of initial discharge capacities, $50^{th}$ cycle discharge capacities, initial charge and discharge efficiencies, and capacity retention ratios are presented in Tables 2 and 3 below. The initial discharge capacity, initial charge and discharge efficiency, and capacity retention ratio are determined according to Equations 1 to 3 below.

Initial discharge capacity [mAh/g]=discharge capacity in a $2^{nd}$ cycle  Equation 1

Initial charge and discharge efficiency [%]=[discharge capacity in the $2^{nd}$ cycle/charge capacity in the $2^{nd}$ cycle]×100  Equation 2

Capacity retention ratio [%]=(discharge capacity in a $50^{th}$ cycle/discharge capacity in the $1^{st}$ cycle)× 100  Equation 3

TABLE 2

|  | Initial discharge capacity [mAh/g] | Initial charge and discharge efficiency [%] | Capacity retention ratio [%] |
|---|---|---|---|
| Example 5 | 202.85 | 94.67 | 79.88 |
| Comparative Example 5 | 197.04 | 92.98 | 46.18 |

As illustrated in Table 2, the lithium battery of Example 5 exhibited improved initial discharge capacity, initial charge and discharge efficiency, and improved capacity retention ratio relative to the lithium battery of Comparative Example 5.

As illustrated in FIGS. 4 and 5, the lithium battery of Comparative Example 5 exhibited a large peak shift and a large difference in peak intensity due to a phase change during a charge and discharge process, and the formation of a new phase was identified at a voltage of about 2.5 V or less.

In contrast, as illustrated in FIGS. 2 and 3, the lithium battery of Example 5 exhibited a small peak shift and a small difference in peak intensity due to the phase change during the charge and discharge process, and there was no formation of the new phase at about 2.5 V or less.

TABLE 3

|  | Initial discharge capacity [mAh/g] | $50^{th}$ discharge capacity [mAh/g] |
|---|---|---|
| Example 6 | 143.33 | 205.76 |
| Example 7 | 101.53 | 43.59 |
| Example 8 | 133.95 | 87.12 |
| Comparative Example 6 | 2.39 | 36.41 |

In Examples 6 to 8 and Comparative Example 6, compositions of active material slurries were changed to obtain a weight ratio of cathode active material:conductive agent:binder of about 90:5:5.

Figure 6:
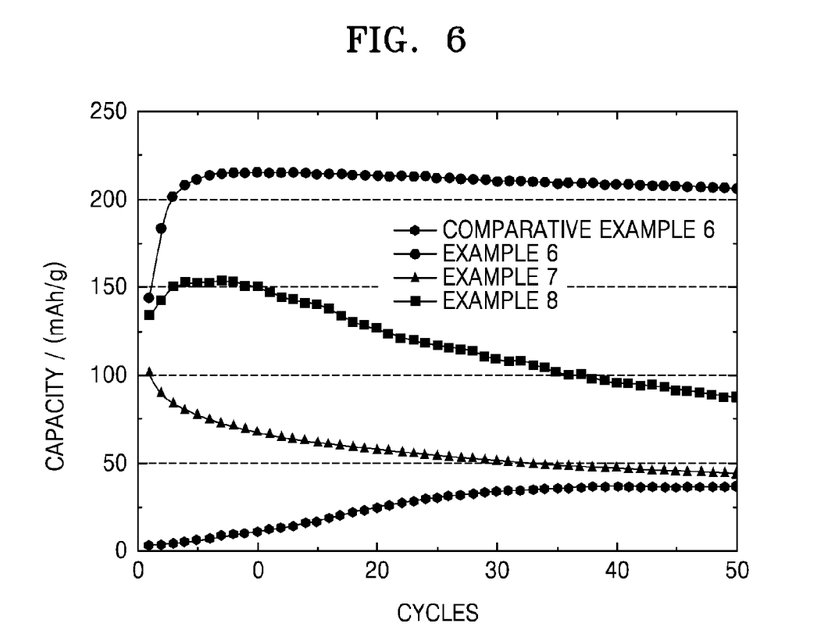
FIG. 6 is a graph of capacity (mAh/g) versus cycle showing charge and discharge profiles of the lithium batteries prepared in Examples 6 to 8 and Comparative Example 6.

As illustrated in Table 3 and FIG. 6, cycle characteristics, such as discharge capacities, of the lithium batteries of Examples 6 to 8 were significantly improved in comparison to the lithium battery of Comparative Example 6.

As described above, according to the one or more of the above embodiments, initial capacity, initial efficiency, and cycle characteristics of a lithium battery may be improved by including a heterogeneous element-substituted cathode active material having a new composition.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A cathode active material comprising a lithium transition metal oxide of Chemical Formula 2:

$$Li_{2-x}Me_xMnO_{3-\delta} \quad \quad \text{Chemical Formula 2}$$

wherein $0<x\leq0.2$ and $0\leq\delta<1$,
wherein Me is one or more metals selected from calcium (Ca), strontium (Sr), tungsten (W), technetium (Tc), rhenium (Re), ruthenium (Ru), osmium (Os), rhodium (Rh), iridium (Ir), palladium (Pd), platinum (Pt), copper (Cu), gallium (Ga), indium (In), and a rare earth element.

2. The cathode active material of claim 1,
wherein $0<x<0.1$, and
wherein Me is Cu.

3. The cathode active material of claim 1, wherein Me is Cu.

4. The cathode active material of claim 1, wherein the lithium transition metal oxide has a layered structure.

5. The cathode material of claim 4, wherein the layered structure is present in an amount of about 90 weight percent to 100 weight percent, based on a total weight of the lithium transition metal oxide.

6. The cathode active material of claim 1, wherein the lithium transition metal oxide does not comprise a phase having a spinel structure.

7. The cathode active material of claim 1, wherein a crystal structure of the lithium transition metal oxide belongs to space group C2/m.

8. The cathode active material of claim 1, wherein the lithium transition metal oxide exhibits a peak at a Bragg angle of about 37.0±0.2 degrees two-theta for Cu-Kα X-ray radiation having a wavelength of about 1.541 Å.

9. The cathode active material of claim 8, wherein an intensity of the peak at a Bragg angle of about 37.0±0.2 degrees two-theta is at least 10 times greater than an intensity of a peak at a Bragg angle of about 36 degrees-two theta to about 36.8 degrees two theta, if present.

10. The cathode active material of claim 1, wherein a lithium battery including the lithium transition metal oxide provides a voltage of about 4.5 volts or more with respect to lithium metal and a discharge capacity of about 200 milli-ampere-hours per gram or more.

11. A cathode comprising the cathode active material of claim 1.

12. A lithium battery comprising the cathode of claim 11.

13. A method of preparing a cathode active material comprising a lithium transition metal oxide, the method comprising:
providing a solution comprising a manganese precursor and a second precursor comprising one or more metals selected from calcium (Ca), strontium (Sr), tungsten (W), technetium (Tc), rhenium (Re), ruthenium (Ru), osmium (Os), rhodium (Rh), iridium (Ir), palladium (Pd), platinum (Pt), copper (Cu), gallium (Ga), indium (In), and a rare earth element;
precipitating the precursors to obtain a metal hydroxide;
mixing the metal hydroxide; and
and heat treating the metal hydroxide and a lithium precursor to prepare the cathode active material,
wherein the lithium transition metal oxide is represented by Chemical Formula 2:

$$Li_{2-x}Me_xMnO_{3-\delta} \quad \quad \text{Chemical Formula 2}$$

wherein $0<x\leq0.2$ and $0\leq\delta<1$, and
Me is one or more metals selected from Ca, Sr, W, Tc, Re, Ru, Os, Rh, Ir, Pd, Pt, Cu, Ga, In, and a rare earth element.

14. The method of claim 13, wherein the second precursor comprises Cu.

15. The method of claim 13, wherein the heat treating is performed in a temperature range of about 500° C. to about 950° C.

16. The method of claim 15, wherein the heat treating is performed in an air atmosphere.

* * * * *